Nov. 25, 1969  J. V. DEJOUX  3,480,362

OPTICAL PRINTER

Filed Dec. 14, 1966  2 Sheets-Sheet 1

INVENTOR.
JEAN VERAN DEJOUX

BY
ATTORNEYS

Nov. 25, 1969  J. V. DEJOUX  3,480,362
OPTICAL PRINTER
Filed Dec. 14, 1966  2 Sheets-Sheet 2
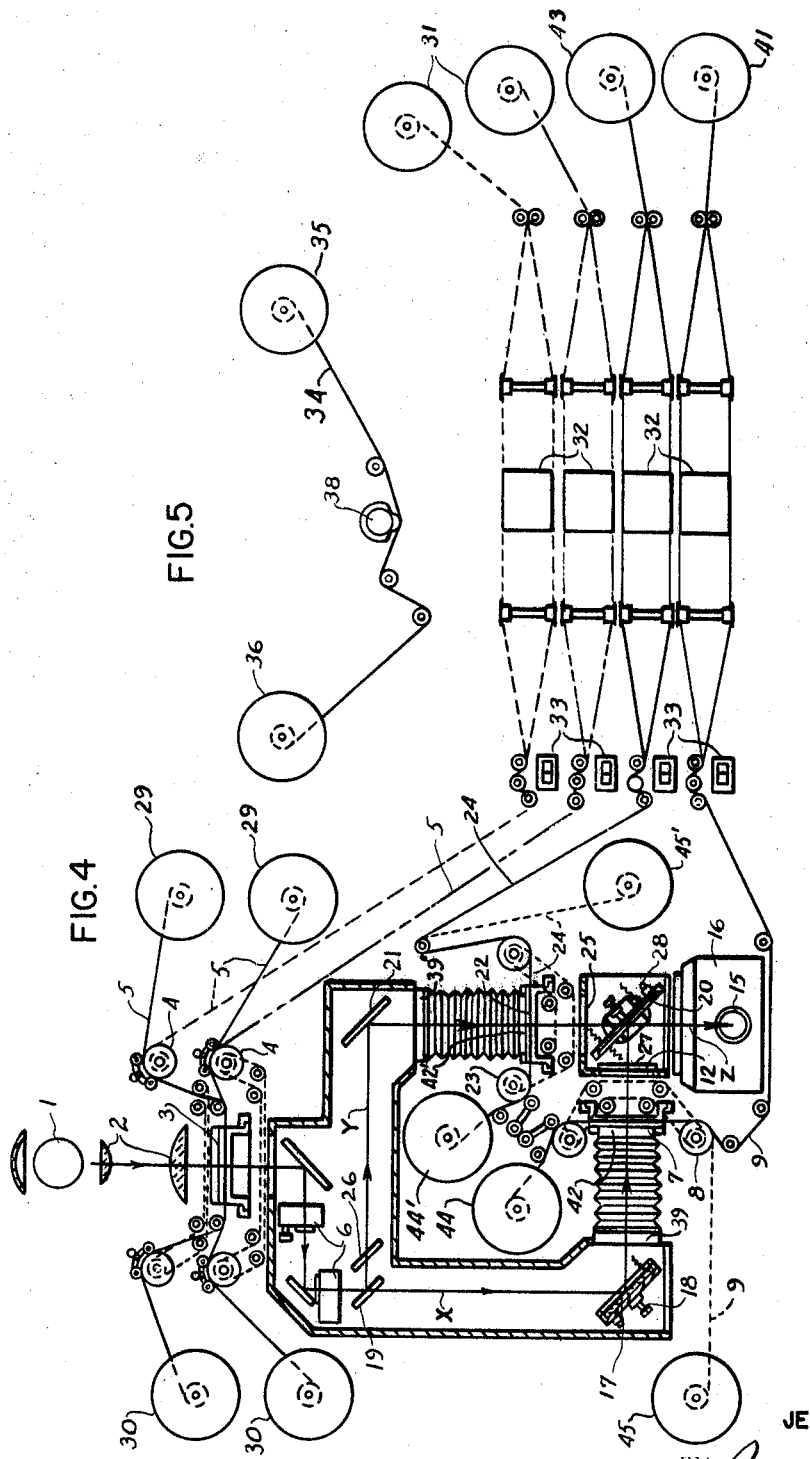
INVENTOR.
JEAN VERAN DEJOUX
BY
ATTORNEYS

United States Patent Office 3,480,362
Patented Nov. 25, 1969

3,480,362
OPTICAL PRINTER
Jean Veran Dejoux, Paris, France, assignor to
Nicolas Reisini, New York, N.Y.
Filed Dec. 14, 1966, Ser. No. 601,584
Int. Cl. G03b 27/52, 13/24, 13/26
U.S. Cl. 355—40  9 Claims

ABSTRACT OF THE DISCLOSURE

An optical printing device for recording photographically on a single photosensitive film strip a plurality of superimposed images projected from pictures previously recorded on two or more film strips. The film strips are advanced independently and may be advanced simultaneously or in any desired sequence. A single beam of light is used to project the image contained on the first film strip to the second film strip and to pass through the second film strip to project the image of the two film strips, in superposed relation, onto the photosensitive film strip.

---

This invention is particularly useful in the making of animated cartoons or other animated motion pictures in which the animation, either in whole or in part, is prepared from pictures which are hand drawn by an artist.

In the preparation of such motion pictures, it frequently happens that it is desirable for the animated figures to move with respect to a stationary background, or for one figure to be animated while another figure temporarily remains stationary. In such situations, and in other similar situations in which animation occurs in only one part of the scene, much labor by the artist may be saved by making it unnecessary for him to draw, on each successive picture of a sequence, the portions of the picture where no animation occurs.

It is an object of the present invention to provide methods and apparatus for recording photographically, on a single photosensitive film strip, superimposed images projected from pictures previously recorded on two or more film strips. Thereby it is possible, for example, to draw or otherwise record a stationary background or a series of stationary backgrounds on one film strip, and to draw or otherwise record the motions of an animated figure or figures by means of a series of pictures on a second film strip. Then, if images from the two strips are projected in superimposed position onto a single photosensitive film strip, a sequence of pictures may be obtained in which the animated figure or figures move against the stationary background or backgrounds.

The great saving in labor by the artist may be visualized if it be assumed that it is desired to use a single stationary background for the first hundred frames of a sequence, and a second single stationary background for the second hundred frames of the sequence. Obviously it is necessary under these circumstances for the artist to make only two background drawings. In such case, the film strip carrying the background drawings would be advanced to a position to project the image of the first background picture on the photosensitive film. Then the film strip carrying the animated sequence would be advanced intermittently step by step to project the images of the first hundred pictures on the photosensitive film, which is advanced intermittently step by step in synchronism therewith. After projection of the hundredth picture, the film strip carrying the background drawings is advanced to a position to project the image of the second background picture, and the projection of the animated sequence is continued.

Other objects and advantages of the invention will appear hereinafter.

A preferred embodiment of the invention selected for purposes of illustration is shown in the accompanying drawings, in which, FIGURE 1 is a diagrammatic view of a simple form of apparatus embodying the invention.

FIGURE 4 is a semi-diagrammatic plan view of a more highly developed form of apparatus embodying the invention, and FIGURE 5 is a diagrammatic view of a control device.

Figure 1:
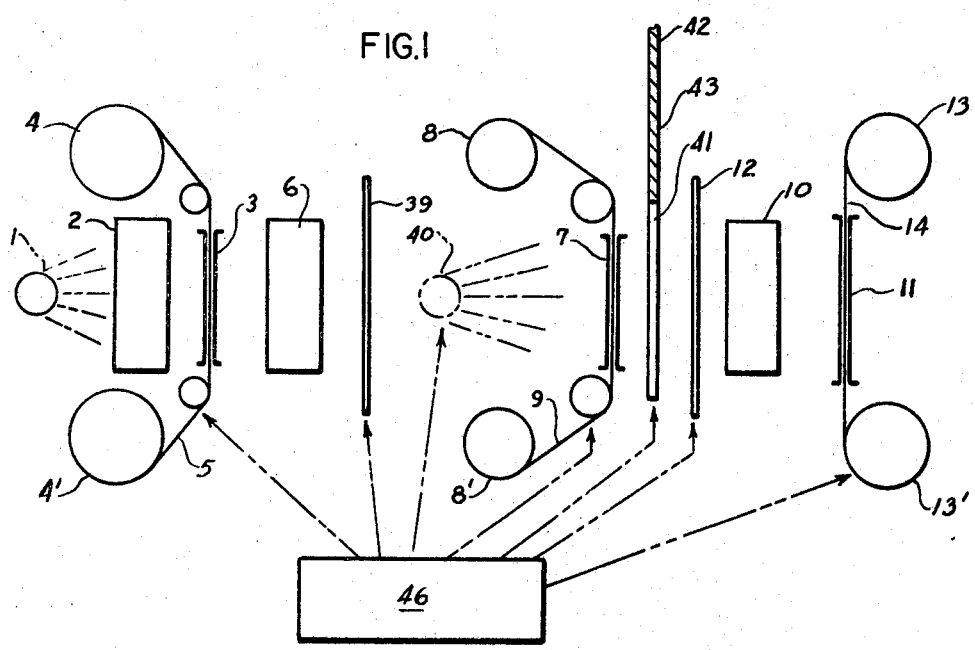

Referring to FIG. 1 of the drawings, in the apparatus shown diagrammatically therein, the film strip 5, carrying a sequence of pictures recorded thereon, is mounted on take up and supply reels 4, 4' and is advanced intermittently through a gate 3 by any of the conventional film strip feeding means known in the art. The film strip is illuminated by a light source 1 to project images of the pictures recorded thereon, the light from which passes through a condenser 2, then through the picture recorded on the frame of film strip 5 which is exposed at the gate 3, and then through an objective lens system 6 adapted to focus the projected image of the exposed picture at the plane of film strip 9 as it is exposed at the gate 7.

Film strip 9, which also carries a sequence of pictures recorded thereon, is mounted on take-up and supply reels 8, 8' and is advanced intermittently through gate 7 by any of the conventional film strip feeding means known in the art.

The beam of light carrying the projected image from film strip 5 then passes through the picture recorded on the frame of film strip 9 which is exposed at the gate 7, and then passes through a second objective lens system 10 adapted to focus the multiple superimposed projected images at the plane of the photosensitive film strip 14 as it is exposed at gate 11.

The photosensitive film strip 14 is mounted on take-up and supply reels 13, 13' and is advanced intermittently through the gate 11 by any of the conventional film strip feeding means known in the art. The multiple superimposed projected images are recorded thereon while the film strip is held stationary between successive advancing movements thereof.

A shutter 12 is interposed between the gate 7 and the gate 11, and is operated in conventional manner to control the duration of exposure and to interrupt exposure of film strip 14 during the advancing movement thereof and during advancing movement of film strips 5 or 9.

It will be understood that the reels 4, 4' and 8, 8', and 13, 13' may be adapted to accept film strips of any desired width, as for example, the conventional widths of 8 mm., 16 mm., 35 mm. or 70 mm., and in each case, the film strip advancing means must be adapted to accept film of the desired width and advance the film strip one frame length on each advancing movement. It will also be understood that it is possible to use previously recorded film strips of different widths for recording on a photosensitive film strip of a width which is equal to that of one, but different from that of another, of the previously recorded film strips, or which is different from that of both of the previously recorded film strips. For example, the film strip 3 may have a width of 70 mm., the film strip 9 may have a width of 35 mm., and the photosensitive film strip may have a width of 35 mm. Alternatively, the film strip 3 may have a width of 70 mm., the film strip 9 may have a width of 35 mm. and the photosensitive film strip may have a width of 16 mm. In such cases, and in similar cases, the objective lens systems 6 and 10 must be adjusted to produce the proper magnification or reduction of the projected images to fit the area of the frames of the respective strips on which they are to be focused.

If desired, an additional refinement may be incorporated in the apparatus to insure sharp edges and precise registration of the superimposed images projected onto the photosensitive strip 14. For this purpose, an additional shutter 39 is placed between lens system 6 and gate 7, and an auxiliary light source 40 is located between the shutter 39 and the gate 7. The light source 40 is mounted to be movable into or out of position to project a beam of light through gate 7, and it may, of course, be provided with a suitable condenser lens system (not shown). Also, a filter holder 42 is located adjacent the gate 7 and preferably between the gate 7 and shutter 12, which said filter holder carries two filters 41 and 43 of different, and preferably complementary colors, as for example, blue and yellow, respectively.

Figure 2:
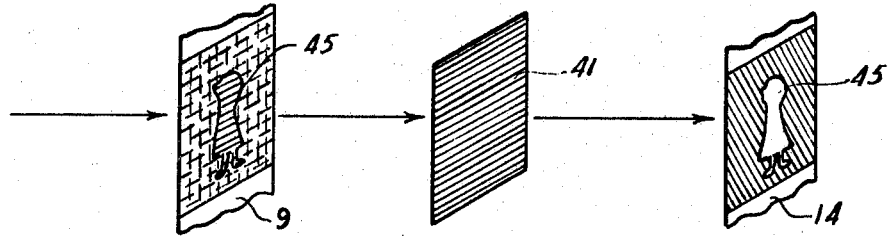
FIGURES 2 and 3 are diagrams illustrating a phase of the invention.
Figure 3:
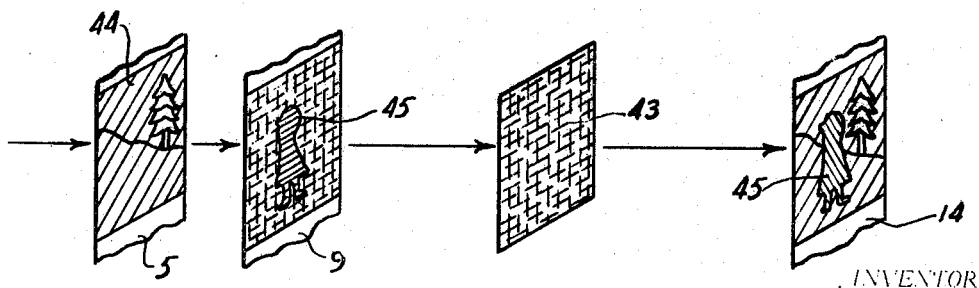

Referring now to FIGS. 2 and 3, let it be assumed that it is desired to record on the photosensitive film strip 14 the figure 45, as recorded on strip 9, against a background 44, as recorded on strip 5. For this purpose, the figure 45 is previously recorded on strip 9 in color A (blue, for example) on a solid background of color B (yellow, for example). With the film 9 exposed at the gate 7, shutter 39 is closed, shutter 12 is closed, and the blue filter 41 is moved to the position shown in FIG. 1. The light source 40 is moved into position to project the image of the picture on the film at gate 7 and the shutter 12 is then opened. The portion of the image which is blue, i.e. the figure 45, is then focused and recorded on the photosensitive film 14. The portion of the image which is yellow, i.e. the background, is not recorded since the yellow rays are stopped by the blue filter 41.

The shutter 12 is then closed, and the yellow filter 43 is moved in front of gate 7. The light source 40 is removed and the shutter 39 is opened. Then, with the film 5 exposed at gate 3, and film 9 exposed at gate 7, shutter 12 is opened. The portion of the projected images which is yellow, i.e. the background, is then focused and recorded on the photosensitive film 14 in register with the portion previously recorded thereon. The figure 45 is not recorded again since the blue rays are stopped by the yellow filter 43.

The operation of the film strip feeding mechanisms for advancing the film strips 5, 9 and 14 may be controlled by a suitable programming device 46, which may also control the movement of the light source 40 and the filter holder 42, and the operation of the shutters 12 and 39. Such programming devices are known in the art, and may be operated manually or under control of punched tape or magnetic tape. In FIG. 5, for example, such a programming device is shown diagrammatically, comprising a magnetic tape 34 carried on take up and supply reels 36 and 35 and adapted to be fed in conventional fashion past a transducer head 38. The magnetic tape may be provided with any number of tracks which may be required to control the operation of the apparatus. For example, referring to FIG. 1, a tape provided with seven tracks could, as indicated by broken lines control (1) movement of film strip 5, (2) movement of shutter 39, (3) movement of the light source 40, (4) movement of film strip 9, (5) movement of filter holder 42, (6) movement of shutter 12, and (7) movement of the photosensitive film strip 14. It will be understood, however, that it is known in the art to record magnetic signals for performing or controlling the performance of several different functions or operations on a single track, and such techniques may be used to reduce the number of required tracks.

A more elaborate apparatus embodying the invention is illustrated in FIG. 4 in which the light beam from source 1 after passing through condenser lens system 2, gate 3 and objective lens system 6, here shown as two units, is split by a semi-transparent, semi-reflective mirror 19, sometimes referred to in the art as a beam splitter, into two beam portions X and Y, the beam X passing through the mirror 19 while the beam Y is reflected at 90°. Beam X then impinges on mirror 17, the position of which may be adjusted by screw 18, and is reflected to pass through gate 7. Beam Y impinges on mirror 21 and is reflected to pass through gate 22. Thereafter beam X impinges on a semi-transparent, semi-reflective mirror or beam splitter 20, while beam Y passes therethrough, the beam portions X and Y being brought together to reconstitute a single beam Z carrying the two images. The mirror 20 may be adjusted by screw 28 to obtain exact registration.

In using the apparatus of FIG. 4, the objective lens system 10, and the photosensitive film 14, reels 13, 13' and drive means therefor may be mounted in a separate housing (not shown) which may be secured to a collar 15 on the housing 16. The beam Z enters the housing 16 which contains a mirror (not shown) which reflects the beam vertically upward to pass through the aperture in the collar 15 into the housing which contains the photosensitive film 14 on which the image is focussed.

As shown in FIG. 4, a plurality of film strips 5 bearing previously recorded pictures may be fed through the gate 3 in superimposed relation, said film strips being carried on supply reels 29 and take-up reels 30. The said strips may be advanced intermittently by conventional film strip feeding means known in the art. The said film strips may be advanced simultaneously, or one strip may be advanced while the other remains stationary, all under either manual control or under control of a suitable programming device as previously described.

Alternatively, the film strips 5 may be carried on supply reels 31, and may be passed through examination positions 32 where the recorded pictures may be examined, corrected, redrawn or retouched before being advanced through the gate 3. If desired, frame counters 33 may be located in suitable position to indicate the number of frames which are advanced to the gate 3.

The film strip 9, also bearing previously recorded pictures, is fed through the gate 7, being carried on supply reel 41 and take-up reel 44. Likewise, the film strip 24, also bearing previously recorded pictures, is fed through the gate 22, being carried on supply reel 43 and take-up reel 44'. As in the case of film strip 5, the film strips 9 and 24 may be passed through examination positions 32 before being advanced through their respective gates 7 and 22. Alternatively, if it is not desired to examine strips 8 and 24, they may be supplied from supply reels 45 and 45'.

A shutter 12 is interposed in the path of the beam X, and a shutter 25 is interposed in the path of the beam Y. The said shutters may be operated to open and shut simultaneously or they may be operated to open and shut individually in any desired sequence.

A shutter 39 and filter holder 42 adapted to carry two filters 41 and 43, corresponding to similarly numbered parts of FIG. 1, may also be interposed in the path of the beam X, and a similar shutter 39' and filter holder 42' may be interposed in the path of the beam Y. The said shutters and filter holders may be operated in the same manner and for the same purposes described in connection with FIG. 1. If desired, the colors of the filters carried by the filter holder 42 may be different from the colors of the filters carried by the filter holder 42'.

In order to compensate for the displacement of the beam X due to its passage through the beam splitter 19, a transparent plate 27 is interposed in the path of beam X. Similarly, in order to compensate for displacement of the beam Y which will occur when it passes through the beam splitter 20, as transparent plate 26 is interposed in the path of beam Y.

It will be understood that, as in the case of FIG. 1, the movement of the various parts of the apparatus including the movement of the various film strips, shutters, filters, etc. may all be controlled by a suitable programming device as previously described.

The above described apparatus provides extreme flexibility and great convenience and saving of labor in the making of cartoons or other animated motion pictures. As shown in FIG. 4, for example, it permits images projected from pictures recorded on four separate film strips to be superimposed and recorded on a single photosensitive film strip. Each film strip may be moved independently or in synchronism with another. It is possible, therefore, by selective movement of the respective film strips, to save much unnecessary labor in repetitive drawing.

It will be understood that the invention may be variously modified and embodied within the scope of the subjoined claims.

I claim as my invention:

1. An optical printing apparatus for recording photographically on a single photosensitive film strip a plurality of superimposed images projected from pictures previously recorded on two or more film strips, which comprises a first film gate, means for advancing a first film strip having previously recorded pictures thereon through said gate, a second film gate, means for advancing a second film strip having previously recorded pictures thereon through said second gate, a third film gate, means for advancing a photosensitive film strip through said third gate, means including a light source adapted to direct a beam of light through said first and second gates for projecting the images of the pictures held at the said first and second gates and focusing them in superposed relation on the photosensitive film exposed at said third gate.

2. Apparatus as claimed in claim 1 in which a shutter is interposed between said second and third gates.

3. Apparatus as claimed in claim 2 in which a second shutter is interposed between said first and second gates, and means interposed between said second shutter and said second gate for projecting the image of the picture held at the second gate and focusing it on the photosensitive film exposed at said third gate when said second shutter is closed.

4. Apparatus as claimed in claim 3 in which said second projecting means is movable into and out of projecting position.

5. Apparatus as claimed in claim 3 including two filters of different, but complementary colors, and means for moving said filters selectively into and out of the path of projection.

6. Apparatus as claimed in claim 1 including means to focus the image of the picture held at the said first gate at the plane of the picture held at the said second gate.

7. An optical printing apparatus for recording photographically on a single photosensitive film strip a plurality of superimposed images projected from pictures previously recorded on two or more film strips, which comprises a first film gate, means for advancing a first film strip having previously recorded pictures thereon through said first gate, a light source adapted to direct a light beam through said first gate, a second film gate, means for advancing a second film strip having previously recorded pictures thereon through said second gate, a third film gate, means for advancing a third film strip having previously recorded pictures thereon through said third gate, a fourth film gate, means for advancing a photosensitive film strip through said fourth gate, means for splitting said light beam and directing one portion thereof through said second gate and another portion thereof through said third gate, and means for bringing together said light beam portions to reconstitute a single beam and for projecting the images of the pictures held at the first, second and third gates and focusing them in superposed relation on the photosensitive film exposed at said fourth gate.

8. The method of optical printing which comprises passing a beam of light through a film having a picture previously recorded thereon to project an image of said picture, focusing said projected image at the plane of a second film having a picture previously recorded thereon, passing said beam through said second film to project an image of said second picture, and focusing the two projected images in superposed relation on a third photosensitive film.

9. The method of optical printing which comprises passing a beam of light through a film having a picture previously recorded thereon in two complementary colors to project an image of said picture, passing said beam through a filter which is the color of one of the said complementary colors and focusing said projected image on a photosensitive film to record thereon the portion of the projected image which is the color of said filter, passing another beam of light through a second film having a different picture previously recorded thereon in the same two complementary colors to project an image of said second picture, focusing said projected image at the plane of said first film, passing said beam through said first film to project an image of said first picture, passing said beam through a second filter which is the color of the other of the said complementary colors and focusing said projected image on the said photosensitive film, in register with the image previously recorded thereon, to record thereon the portion of the projected image which is the color of said second filter.

References Cited

UNITED STATES PATENTS 2,148,814  2/1939  Ionesco et al. _____ 88—24
2,174,931  10/1939 Terry et al.

NORTON ANSHER, Primary Examiner
W. A. SIVERTSON, Assistant Examiner

U.S. Cl. X.R.
355—44